Jan. 18, 1938.   N. M. THOMAS   2,106,076
VISCOUS LIQUID FILLING AND MEASURING APPARATUS
Filed Aug. 24, 1935   3 Sheets-Sheet 3
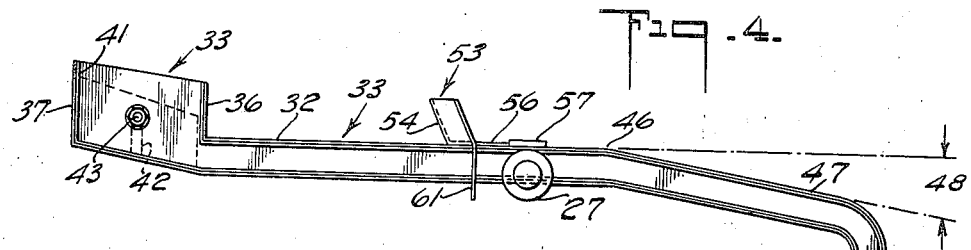
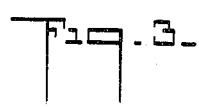
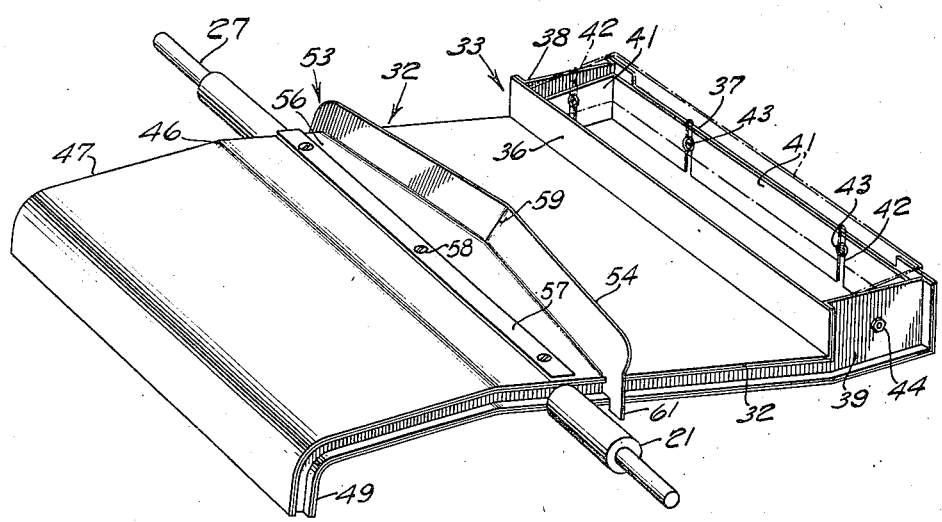
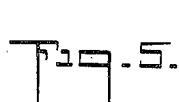
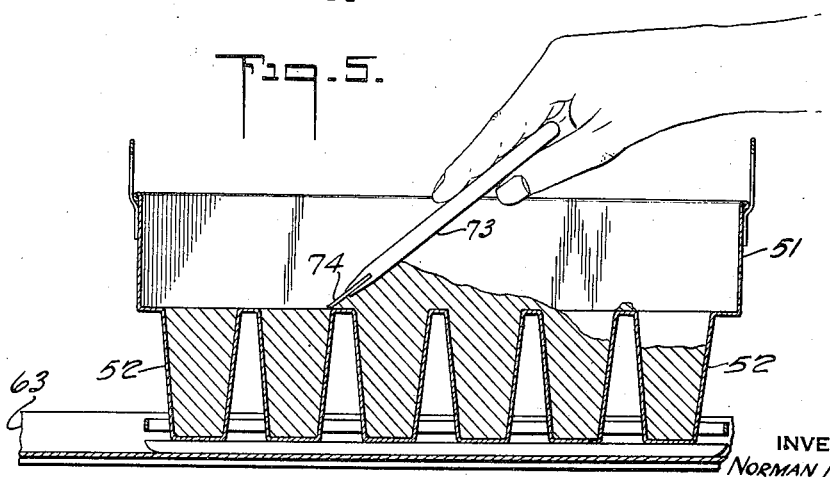
INVENTOR
NORMAN M. THOMAS.
BY Richard Newling
ATTORNEY

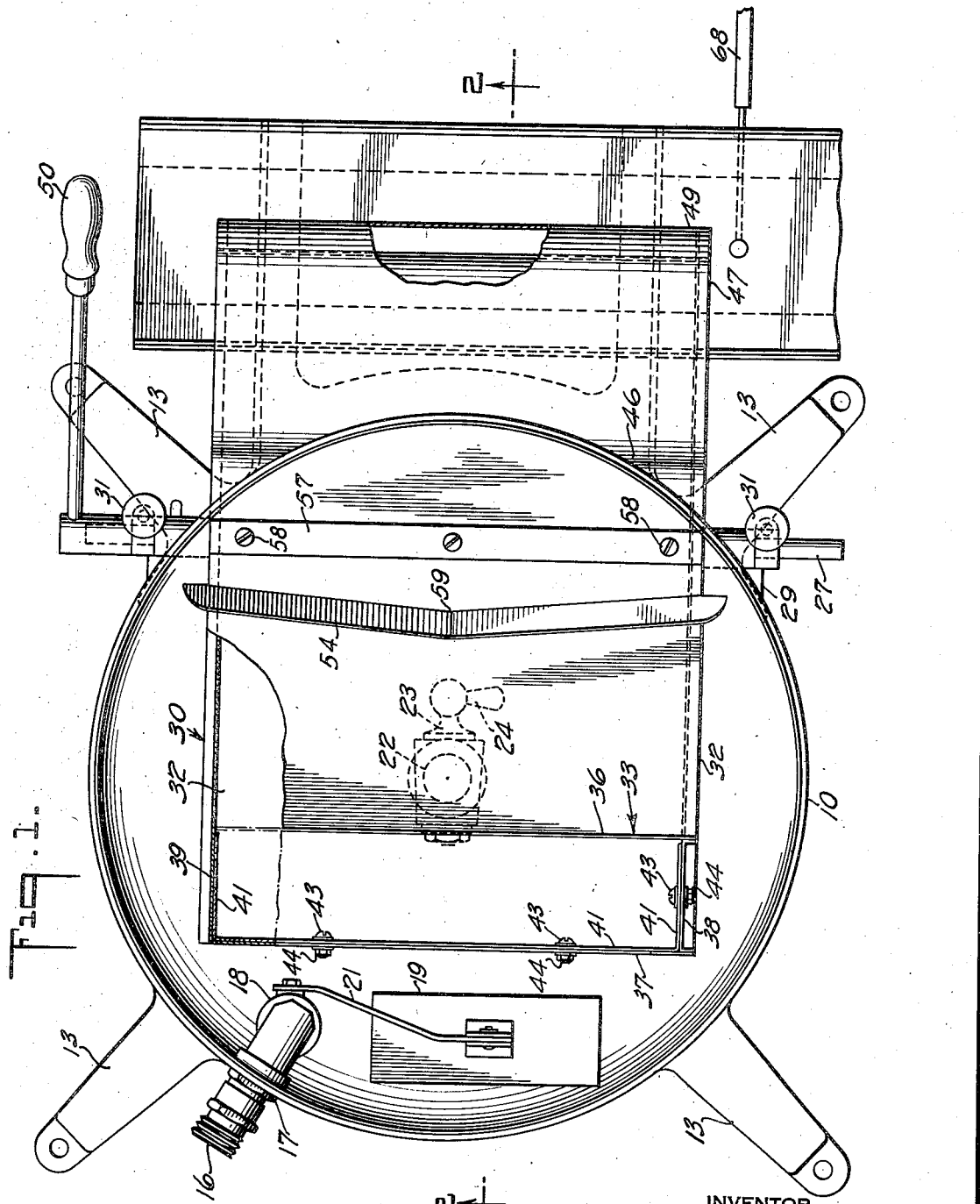

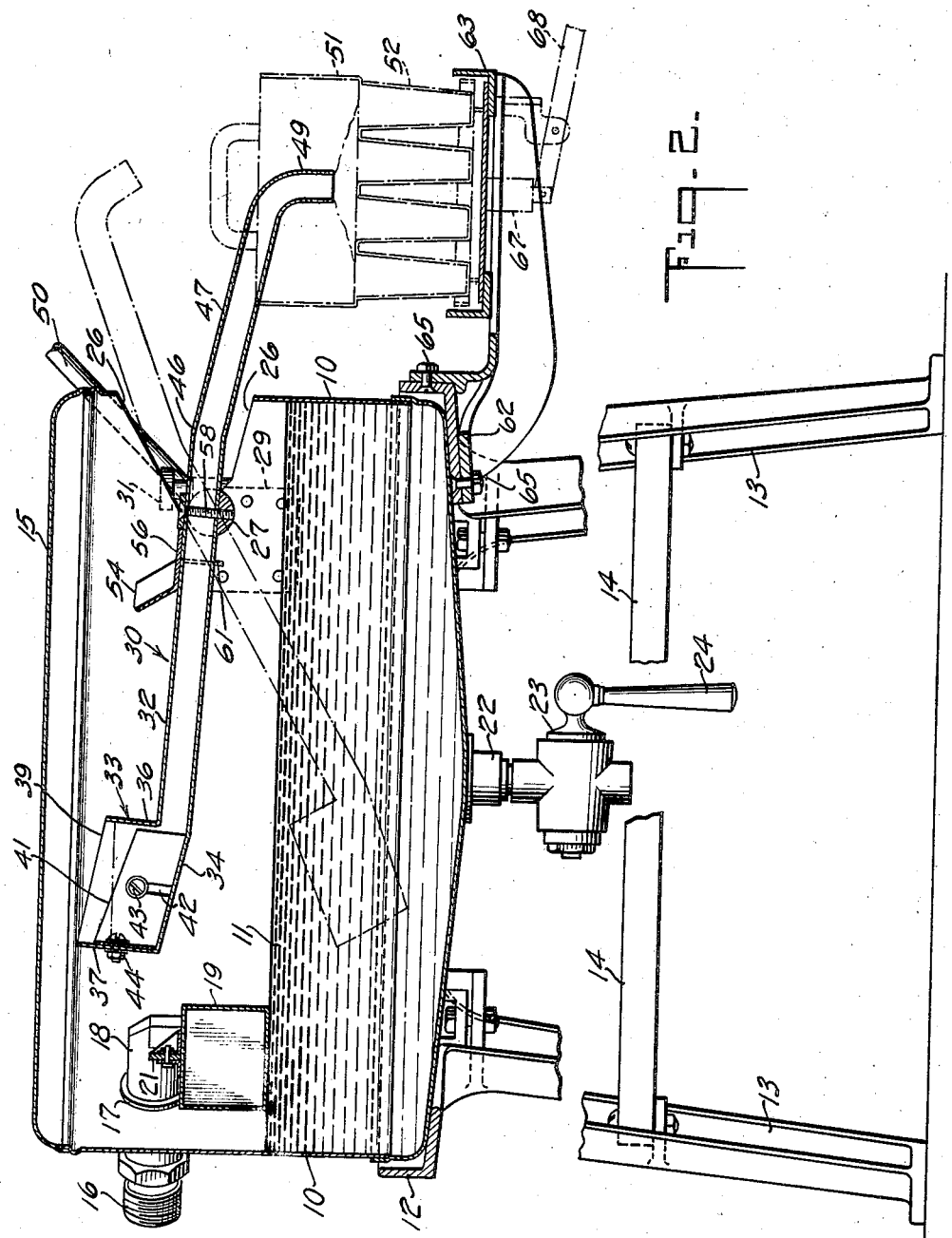

UNITED STATES PATENT OFFICE 2,106,076

VISCOUS LIQUID FILLING AND MEASURING APPARATUS

Norman M. Thomas, Brooklyn, N. Y., assignor to Joe Lowe Corporation, New York, N. Y., a corporation of Delaware Application August 24, 1935, Serial No. 37,675

6 Claims. (Cl. 226—104)

The present invention relates to filling and measuring apparatus, and it has particular relation to apparatus adapted to deliver accurately measured quantities of liquid, semi-liquid and viscous materials from a supply tank to a receptacle spaced therefrom.

My invention is directed to improvements in apparatus of the type disclosed in United States Letters Patent No. 1,955,441, issued April 17, 1934, to Milton Schnaier, and the apparatus described in the co-pending application of Edwin W. Kronbach, Serial Number 705,175, filed January 4, 1934 (now United States Letters Patent No. 2,024,130, issued December 10, 1935), which apparatus is devoid of valve mechanism, and the accuracy of the measured quantity of material delivered depends generally upon the liquid level in the dipper being in a true horizontal plane, uniform cross-sectional area of the delivery chute and the arrangement of the chute in a horizontal plane at the dipper junction.

The apparatus disclosed in the aforementioned Letters Patent and application for Letters Patent utilizes a plurality of tubes for delivering a liquid material from a supply tank to a plurality of spaced receptacles. It has been found, however, that the tube arrangement is not adaptable for delivering semi-liquid or viscous materials rapidly and economically, the viscosity of the material being too great to permit it to flow readily and rapidly through tubes of small cross-sectional area wherein there is a great amount of frictional resistance to a small quantity of material. By semi-liquid or viscous materials, I mean to include heavy syrups, potable liquids, ice cream mix or semi-frozen ice cream as it is drawn from a conventional ice cream freezer in an ice cream plant, and similar materials.

An object of the present invention is to provide an apparatus of the character described which will accurately deliver a measured quantity of viscous material from a supply tank to a receptacle spaced therefrom quickly, economically and efficiently.

A further object of the invention is the provision of simple and inexpensive apparatus capable of accurately measuring and delivering a semi-liquid or viscous material from a supply tank to a receptacle spaced therefrom.

Another object of the invention is the provision of simple and inexpensive means for varying the quantity of measured material to be delivered by the apparatus from the supply tank to a receptacle spaced therefrom.

Another object of the present invention is to provide a new element for a machine of the class described consisting of a tilting structure having a relatively wide chute provided with an open-top adjustable dipper mounted in open communicating relation at all times with respect to its receiving end, and which is adapted to be used interchangeable with the corresponding element described and claimed in aforementioned United States Letters Patent No. 2,024,130.

Other and further objects and advantages of the invention reside in the detailed construction of the apparatus, which results in simplicity, economy and efficiency, and which will be apparent from the following description, wherein a preferred form of embodiment of the invention is shown.

In accordance with a preferred embodiment of the invention, a supply tank is provided with means for automatically maintaining a substantial quantity of material therein. Mounted on the supply tank above the material level is a tiltable or rockable structure, having a relatively wide chute of uniform cross-sectional area mounted intermediate its ends. The chute which is mounted on the tilting structure, has its receiving end rigidly connected in communicating relation with a dipper adapted to be submerged and withdrawn from the material in the supply tank. The opposite end of the chute is bent downwardly to provide a vertical delivery spout adapted to extend partially into the receptacle to be filled with material from the tank. The chute is declined along a transverse axis intermediate the tilting structure and the delivery spout. This permits the tilting structure to be maintained on approximately a horizontal plane, with the dipper entirely withdrawn from the material in the tank, thereby causing the weight of the head of material in the dipper to force, by gravitational pressure, a portion of the material from the dipper into the chute until the latter is entirely filled to its transverse axis of declination, without discharging any material into the receptacle. The ability to completely fill the chute with material to the axis of declination materially reduces the actual time of discharging the material into the receptacle, maintains the material in an even cross-sectional stream to a point immediately adjacent the discharging end of the chute, thereby facilitating rapid removal and reducing the possibility of uneven distribution into the receptacle to a minimum. By forcing the material into the chute at the earliest possible moment, even before the dipper is entirely withdrawn from the material in the tank, and then maintaining the stream of material in the chute in an even cross-sectional depth without permitting any discharging until desired, it is possible to use a tiltable type of measuring and filling apparatus economically in the delivery of viscous materials.

The dipper member, which is attached to the receiving end of the chute, is provided with telescopic back and side walls, which may be raised and lowered, as desired, to increase or decrease the quantity of material to be accurately measured, removed and delivered with each operation of the tilting structure. The raised back and sidewalls increases the cubical measurements of the dipper, thereby increasing the amount of material removed from the tank with each submersion and withdrawal of the dipper from the material therein.

Reference now being had to the accompanying drawings, forming a part of my specification, in which:

Fig. 1 is a top plan view of the filling and measuring apparatus constructed in accordance with the principles of my invention;

Fig. 2 is a cross-sectional view of the apparatus shown in Fig. 1, the same being taken substantially along the line 2—2 thereof;

Fig. 3 is an enlarged perspective view of the tilting mechanism of the apparatus shown in Fig. 2;

Fig. 4 is a side elevational view of the tilting mechanism shown in Fig. 3; and

Fig. 5 is a longitudinal sectional view of the receptacle filled with material from the apparatus, as shown in Fig. 2, and illustrates the manner in which the viscous material is manually squeegeed into the individual cavities of the receptacle.

Referring now to the drawings in detail, there is shown a tank 10 adapted to contain a supply of viscous material 11, the tank 10 being supported upon an angle iron frame base 12, which rests upon legs or standards 13, suitably braced as at 14 intermediate their ends. The tank 10 is provided with a cover 15 to protect the material from dust, dirt and the like. A supply pipe 16, for conveying the material from a source of supply to the tank 10, is preferably coupled as at 17 to the sidewall of the tank 10 adjacent the upper edge thereof. A float control valve 18, which is a conventional construction, controls the flow of material 11 into the tank, thereby automatically maintaining a proper level of material 11 at all times in the tank 10. The controlling float 19 is coupled to the valve 18 by a float rod 21, as best shown in Fig. 1. An outlet pipe 22 extends through the bottom of the tank 10, and is provided with a conventional manually operated valve 23, having a handle lever 24, for draining the material 11 from the tank 10 when desired, as for instance, for the purpose of cleaning the inside of the tank 10 or for changing the nature of the material 11 to be measured and delivered by the apparatus.

The forward wall of the tank 10, adjacent the upper edge and above the material level, is cut away, as indicated at 26, to accommodate a rocker shaft 27, extending transversely of the tank 10. The ends of the shaft 27 are journaled in bearings mounted in brackets 29, secured to the exterior of the tank 10, adjacent the opening 26. The shaft 27 is clampingly mounted in the brackets 29, and can be removed by loosening the thumbscrews 31, which permits the upper half of the brackets and bearings to be withdrawn, thereby enabling the shaft to be removed from the apparatus.

Mounted on the rocker arm or shaft 27 is a chute 30, connected at its inner or receiving end 32 (which comprises that portion of the chute 30 between the dipper and the axis of declination 46) in communicating relation with a dipper 33. The dipper 33 consists of a pan having a bottom 34 and upstanding sidewalls 36 and 37 and end walls 38 and 39. The chute 30 is connected to the dipper 33 through the front sidewall 36 adjacent the bottom 34 by soldering or welding or other suitable means. The dipper 33 is so mounted on the receiving end 32 of the chute 30, as best shown in Fig. 3, that its bottom 34 is in a plane declined with respect to the plane of the receiving end 32 of the chute 33 when the latter is in either its horizontal or discharging position. The back sidewall 37 and the ends 38 and 39 are provided with a telescopic member 41, which is approximately the same size and shape as the inside of the back wall 37 and the end walls 38 and 39, and is adapted to snugly fit within the dipper 33 adjacent said walls 37, 38, and 39. The member 41 is adapted to be raised and lowered with respect to the sides of the dipper 33, and to facilitate this telescopic action the member 41 is provided with a series of vertical slots 42, extending inwardly from the bottom edges of the walls 37, 38, and 39, said slots 42 are adapted to slide over bolts 43 extending through openings in the walls 37, 38, and 39. These bolts 43 must be loosened to permit movement of the sliding telescopic member 41, and, when the sides of the dipper 33 have been extended by manually raising the member 41, the bolts 43 may be tightened on the nuts 44 thereby fixedly securing the member 41 to the dipper 33. Obviously, by so increasing the height of the walls 37, 38, and 39 of the dipper 33, the amount of material 11 removed from the tank 10 with each operation of the apparatus is correspondingly increased. The sidewall 36 does not require an extensible member for the reason that the greater the head of material in the dipper 33 the greater the distance the material 11 is forced through the chute 30, so that any increase in the amount of material 30 removed from the tank 10 by reason of the extension of the sides 37, 38, and 39 of the dipper 33 is forced into the receiving end 32 of the chute 30 as the dipper 33 is withdrawn from the material 11 in the tank 10. In this way a uniform liquid level is maintained in the dipper 33, which is always below the top of the front sidewall 36 thereof, and there is no danger of the material 11 overflowing the side 36 of the dipper 33.

The chute 30 is declined along a transverse axis at a uniform distance beyond the tilting structure, as indicated at 46, thereby providing a declined portion 47, as best shown in Fig. 4, wherein the numeral 48 indicates the angle of declination. It will be noted that the discharging end 47 and the bottom 34 of the dipper 33 are in parallel planes and have the same angle of declination with respect to the receiving end 32 of the chute 33 when the latter is in either its horizontal or discharging position. In actual operation, the pressure of the head of material 11 in the dipper 33 forces the material into the receiving end 32 of the chute 30 before it has been withdrawn to the position where the receiving end 32 approaches its horizontal plane. With a greater head of material 11 in the dipper 33 due to the extensions of its telescopic sides 37, 38 and 39, there is a correspondingly greater force exerted on the bottom of the material 11 therein, causing it to flow a greater distance into the receiving end 32 of the chute 30. The chute 30, with the axis of declination 46 being positioned at a point between the tilting shaft 27 and the vertical delivery spout 49, is so designed that no material 11 will be discharged until the receiving end 32 is above its horizontal plane. The angle of declination of the bottom 34 of the dipper 33 and the angular design of the relatively wide chute 30 permits the material 11 to flow toward the axis of declination 46 in the chute 30 in an even cross-sectional stream, thereby traversing its major distance of travel prematurely of the time of actual discharge. With the discharging portion 47 (which is that portion between the axis of declination 46 and the vertical delivery spout 49) being declined downwardly very little movement of the tilting structure is required to cause a discharge of the material 11 into a receptacle 51. For this reason, it is not necessary to move the dipper 33 any distance above the material level in the tank 10, or above the top thereof, and therefore the cover 15 may be left on the tank 10 during operation of the apparatus.

The vertical delivery spout 49 (which comprises that portion of the chute 30 that is bent downwardly vertically of the horizontal axis of the apparatus at the extreme outer end thereof) is bent downwardly so as to extend into the receptacle 51 to be filled with a measured quantity of material 11 in order to prevent undue splashing thereof during the filling operation.

It will be apparent that when the rocker shaft 27 is tilted in one direction by the handle 50, the dipper 33 will be submerged in the material 11 in the tank 10, as shown in dotted lines in Fig. 2, and that as the shaft 27 is tilted or rocked in the opposite direction as shown in full lines in Fig. 2, the dipper 33 with its material contents will be raised above the level in the tank 10, and as the receiving end 32 of the chute 30 approaches its horizontal plane, the force of the head of material in the dipper 33 will cause more material 11 to flow into the chute 30 due to an increase in the pull of gravity until it reaches or approaches the axis of declination 46. As the receiving end 32 is raised above its horizontal plane, the pressure of the head of material in both the dipper 33 and the receiving end 32 of the chute 30 is sufficient to cause a flow of material 11 through the discharging end 47 thereof and the flow is thereupon continued by gravity until the contents of the dipper 33 and the chute 30 has passed out of the delivery spout 49 into the receptacle 51.

As indicated in Fig. 2, the inner or receiving end 32 of the chute 30 is submerged in the material 11 in the tank 10 when the dipper 33 is lowered to receive a charge of material. Thus, means must be provided for preventing the material 11 from escaping beyond the rocker shaft 27 and soiling the outside of the machine and the discharging end 47 of the chute 30. The means shown comprises an angle iron member 53 extending transversely of the chute 30 along the top thereof, and provided with an upstanding flange 54. The base 56 is secured to the top of the chute 30 by means of a clamping plate 57 and bolts 58, which bolts 58 also secure the chute 30 to the shaft 27. The member 53 and the flange 54 are pointed centrally of the chute 30 to cause a deflection of the material toward opposite sides of the apparatus, as indicated at 59, and the member 53 also has downwardly projecting flanges 61 adapted to snugly fit the contour of the side of the chute 30 and to extend therebelow, thereby to prevent the material 11 passing beyond the member 53 along the sides of the chute 30 and causing it to return to the tank 10.

Mounted on the forward wall of the tank 10, and directly below the cut-away portion 26, is a bracket 62, secured to the bottom and forward exterior of the tank 10 by bolts 65. The bracket 62 supports a track 63 adapted to receive a receptacle 51, having a plurality of dependant mold cavities 52. The track 63 is provided with a stop 67 adapted to prevent forward movement of the receptacles 51 as they are moved or slid along the track 63, thereby causing the forward receptacle to be centered directly beneath the delivery spout 49. Means for manually withdrawing the stop 67 from the track 63 is provided in the form of a lever 68, thereby permitting the receptacles 51 to be moved along the track 63 after they have been filled with a measured quantity of material 11.

As shown in Fig. 5, the material 11 deliverable by the apparatus is of such viscosity as not to flow readily into the individual molds or cavities 52 of the receptacle 51. Therefore, a squeegee 73, having a flexible rubber wiping blade 74, is manually operated to force the material 11 down into the respective mold cavities. The apparatus having delivered an accurately measured quantity of material 11 into the receptacle 51 to fill each of the cavities 52, the operation of the squeegee will merely cause the materal to flow into the respective cavities until each is filled completely.

Although I have only described in detail one form which my invention may assume, it will be apparent to those skilled in the art that the invention is not so limited, but that various modifications may be made therein without departing from the spirit of the invention or from the scope of the appended claims.

What I claim is:

1. An apparatus for delivering a measured quantity of material to a receptacle comprising a supply tank, a relatively wide chute mounted to tilt about an axis disposed transversely intermediate its ends, an open-top dipper mounted adjacent the receiving end of said relatively wide chute and being in open communication with said chute throughout the entire length of said dipper, said dipper having telescopically adjustable sides for varying the quantity of material to be dipped from said tank with each tilting operation.

2. In a machine of the class described, a tank for containing a quantity of material, a tilting structure, a relatively wide chute mounted intermediate its ends on said tilting structure, the receiving end of said chute having an open-top dipper in communicating relation therewith throughout the entire length of said dipper, said dipper being mounted on said chute with its bottom at an angle declined with respect to the receiving end thereof when the latter is in a horizontal or discharging position, and the discharging end of said chute being declined with respect to the receiving end along a transverse axis spaced outwardly from said tilting structure.

3. In a machine of the class described, a tank for containing a quantity of material, a tilting structure, a relatively wide chute mounted intermediate its ends on said tilting structure, an open top dipper transversely mounted on the receiving end of said chute, said dipper being in open communicating relation with said chute throughout the entire length thereof, said dipper having its bottom thereof in a plane at an angle with respect to the receiving end of said chute, and the discharging end of said chute being declined with respect to said receiving end along a transverse axis spaced outwardly from said tilting structure and in a plane parallel to the plane of the bottom of said dipper.

4. As a new element for a machine of the class described, a shaft, a relatively wide chute tiltably mounted thereon intermediate its ends, said chute having its receiving end in one plane and its discharging end in a plane declined with respect to the receiving end along a transverse axis thereof spaced outwardly from said shaft, and an open-top dipper mounted transversely of the receiving end of said chute, said dipper being in open communication throughout its length with said chute and being mounted with its bottom at an angle declined with respect to said receiving end when the latter is in a horizontal or discharging position.

5. As a new element for a machine of the class described, a shaft, a relatively wide chute tiltably mounted on said shaft intermediate its ends, said chute having its receiving end in one plane and its discharging end in a plane declined with respect to the receiving end along a transverse axis thereof spaced outwardly from said shaft, and an open top adjustable dipper mounted transversely of the receiving end of said chute and in a plane parallel to the plane of the discharging end of said chute, said dipper being in open communication throughout its entire length with said chute.

6. As a new element for a machine of the class described, a shaft, a relatively wide chute tiltably mounted on said shaft intermediate its ends, said chute having its receiving end in one plane and its discharging end in a plane declined with respect to the receiving end along a transverse axis thereof spaced outwardly from said shaft, and an open-top dipper mounted in communicating relation with respect to said receiving end and in a plane parallel to the plane of the discharging end of said chute, said dipper being in open communication throughout its entire length with said relatively wide chute, said dipper having adjustable sides for varying its dipping capacity and also means for locking said sides in their various adjustments.

NORMAN M. THOMAS.